W. W. Calvert.
Combing Mach.
RX No: 52.
Reissued Sept. 9, 1843.
9098X Related Doc
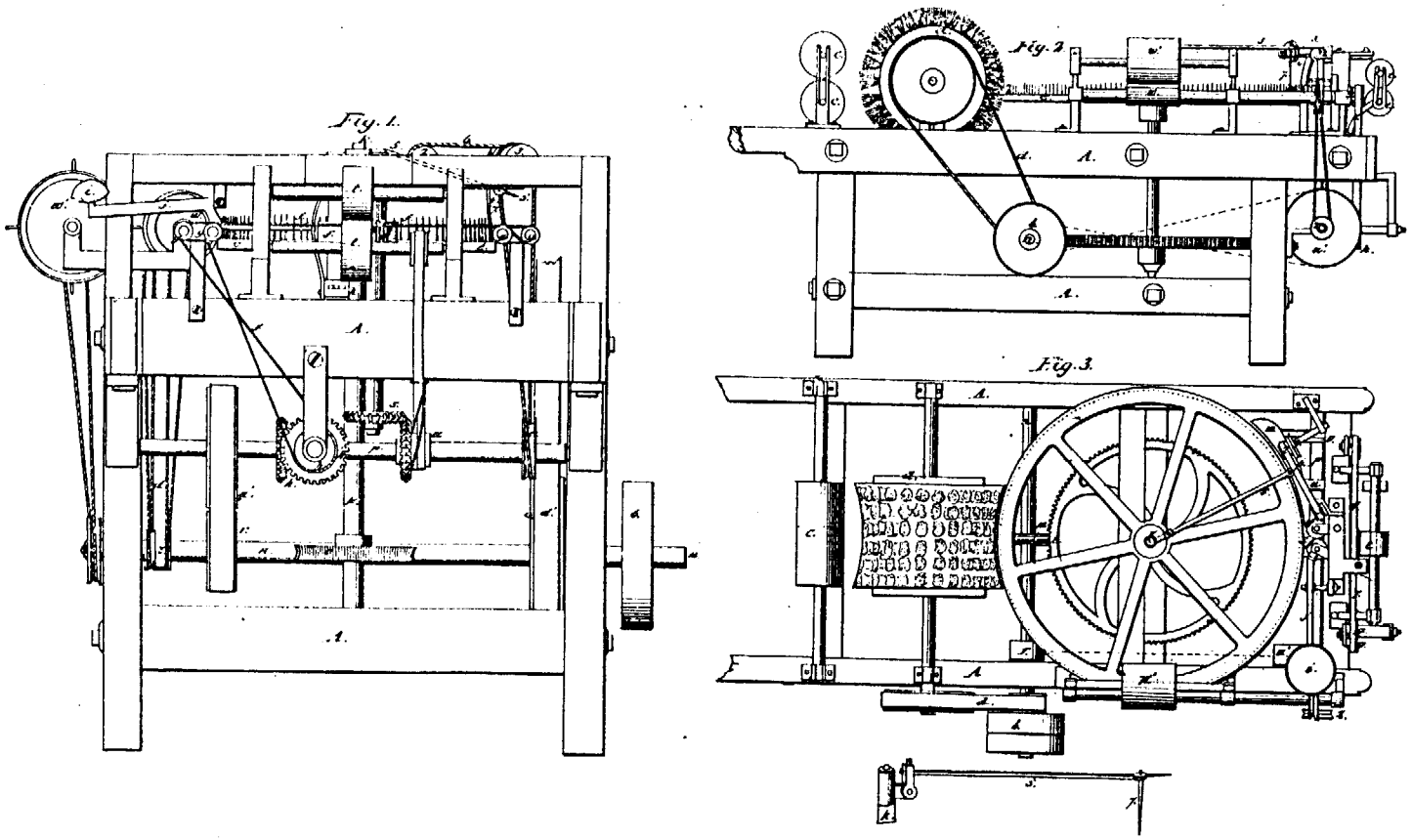
H. PETERS, PHOTO-LITHOGRAPHER, WASHINGTON D. C.

UNITED STATES PATENT OFFICE.

GEORGE W. LYMAN, OF BOSTON, MASSACHUSETTS, ASSIGNEE OF WILLIAM W. CALVERT.

Rx 52

IMPROVEMENT TO BRUSH WOOL OR FLAX INTO TEETH SET IN A CYLINDER OR OTHERWISE.

Rx 9098X

Specification forming part of Letters Patent dated September 18, 1835; Reissue No. 52, dated September 9, 1844.

*To all whom it may concern:*

Be it known that I, GEORGE W. LYMAN, of the city of Boston, in the county of Suffolk and State of Massachusetts, am the assignee of all the right, title, and interest in and under Letters Patent of the United States granted to WILLIAM W. CALVERT, dated September 18, 1835, for a new and useful Improvement to Brush Wool or Flax into Teeth Set in a Cylinder or otherwise, as may be convenient, and also for combining the parts of the universal swiper, called a "wool and flax brusher for separating long fibers from short fibers;" and believing that said Letters Patent are inoperative and invalid by reason of a defective specification, and that said defect arose from inadvertence and mistake and without any fraudulent or deceptive intention, I, the said GEORGE W. LYMAN, have surrendered the said Letters Patent to be canceled of record; and I do hereby declare that I do verily believe that the following is a full, clear, and exact description of the machine invented by the said WILLIAM W. CALVERT for brushing wool and flax as it existed at the time of the grant of said Letters Patent, reference being had to the drawings hereto annexed and made a part of this specification, in which—

Figure 1 is a front elevation; Fig. 2, a side elevation, and Fig. 3 a top plan.

The same letters and figures refer to the same parts in each drawing.

The invention is in the machinery for brushing the fibers of wool or flax into teeth which convey them round to draw-rollers, at which point the long fibers are collected and conducted between said rollers by what is denominated a "universal swiper," the short fibers remaining in the teeth till they arrive at another point in the circuit, where they are swept off from the teeth by a small card-cylinder.

The construction is as follows: A suitable frame, A A, is made, which may consist of four parts connected together by proper rails and cap pieces for sustaining the machinery. On the bottom side rails are bearings to sustain a horizontal shaft, *n*, which passes through the center of the machine, and to one end of which, outside of the frame, a driving-pulley, *b*, is affixed. In the middle of this shaft there is a worm-wheel, *m*, which works into a worm gear-wheel, *l*, situated on the lower part of an upright shaft, *k*. On this shaft, near the upper end, there is a circular disk or cylinder, *e*, which revolves horizontally. Its outer edge is set round with teeth, which project perpendicularly to the face of the disk. Near one end of the frame two feeding-rollers, *c c*, are situated, the lower one being nearly on a level with the disk *e*. Between these feeding-rollers and the disk there is a brush, *d*, cylindric in form, but having its periphery curved or hollowed inward from the ends to the center, the curve having the same radius as the disk *e*. This cylinder is set round with strong bristle or wire brushes or flexible teeth, which come slightly in contact with the teeth on the disk above named. This brush is turned by a cross-band, *d'*, which connects it with a pulley on the shaft *n*.

At the end of the machine, opposite the brush *d* and under the cap-piece of the frame, there is a front cross-shaft, *p*, supported on brackets attached to the frame. This shaft is connected with the driving-shaft *n* by a band leading from pulley *r* on the shaft *n* to a pulley, *n'*, on shaft *b*. In the center of the front of the machine are two draw-rollers, *f f*, standing vertical. The axis of one of said rollers extends down to the shaft *p*, and is connected with it by two bevel gear-wheels, *s*. In front of the draw-rollers are two carrying-rollers, *t t*, driven by a cross-band from pulley *u* on the shaft *p*. Between the draw-rollers and carrying-rollers is placed the twisting-belt 8, which passes over four pulleys, *g*, on a level with the carrying-rollers—two on each side—and arranged in the usual way, the belt 8 passing down round a pulley, *b*, on a level with the shaft *p*, and is geared with it by the bevel-wheels *b'*.

The universal swiper is formed as follows: On one side of the draw-rollers *f*, and above them, there is placed an endless belt, 6, which is at a tangent with the circumference of the disk *e*, and is extended over two rollers, 2 3, set horizontally at a sufficient distance apart, these rollers being put in motion by a band leading from a pulley, *g*, that connects roller 3 with a pulley, *v*, on the shaft *p*. To the belt 6 a loop or eye is fastened, through which the end of a small shaft or arm, 5, passes, and by which said arm is guided. The other end of the arm is attached to a universal joint connected with the upper end of the shaft *k*, from which the arm projects out radially. Near the end of the shaft or arm 5, and between the teeth on the disk and the belt 6, a prong or finger, 7, depends down, so that when the arm 5 is at its lowest point the lower end of the finger extends a little below the teeth on the disk, and sweeps round just outside of them till the arm reaches the roller 2, and follows the eye around, draws up the finger 7, and carries it off from the teeth while the arm is returning to the roller 3, where it descends, and again sweeps the finger back outside of the teeth to the first-named roller 2. Between the draw-rollers *f* and the brush *d* there is a small cylinder, *w*, covered with card-teeth or other suitable substance, which revolves vertically by means of a band connecting it with either of the shafts *n* or *p*, just outside of the teeth on the disk, and is for the purpose of taking the short fibers out of the teeth. This cylinder is stripped by a picker-cylinder, *w'*, that is placed in contact with it.

When the machine thus constructed is put in operation, the wool or flax is fed into it between the rollers *c c*, from which it is taken by the brush *d* and brushed into the teeth on the disk *e*, which are made to traverse slowly, close to the outer circumference of the brush by the worm-wheel *m* on the driving-shaft, the long fibers depending from the teeth outside of the disk. When these fibers are brought opposite the roller 3 of the universal swiper, they are caught by the descending-finger 7 and drawn forward in the direction of the revolution of the disk toward the draw-rollers *f*, by which they are caught and pulled out from the teeth. They then pass between the upper and under twisting-belt 8, and also between the carrying-rollers, into a can in a continuous roping ready for spinning. The short fibers which remain between the teeth are conveyed to the card-cylinder that takes them off, and is itself stripped by a picker, *w'*, which throws the wool into a box. The teeth then pass on again to the brush *d*, where the same operation is repeated.

Having thus fully described the construction and operation of the machine for brushing wool or flax, what I claim as the invention of WILLIAM W. CALVERT, and for which I desire the reissue of Letters Patent, is—

1. The revolving concave cylinder or brush *d*, set with or surrounded by stiff bristles or wire, or other flexible teeth or brushes, said cylinder being so curved inward from the ends to the center as to adapt it to the convexity or curvature of the circumference of the disk or cylinder *e*.

2. The universal swiper, by which the ends of the long fibers are collected and carried to the drawing-rollers, constructed and arranged substantially in the manner and for the purpose herein fully set forth.

3. The combination of the concave cylinder *d* and the universal swiper with the revolving toothed disk or cylinder *e*, substantially in the manner and for the purposes before described.

In testimony whereof I, the said GEORGE W. LYMAN, hereto subscribe my name.

GEO. W. LYMAN.

Witnesses:
THOS. G. CARY, JR.,
THOS. G. CARY.